United States Patent
Clarke

(10) Patent No.: US 10,495,766 B2
(45) Date of Patent: Dec. 3, 2019

(54) OPTOELECTRONIC NEUTRON DETECTOR

(71) Applicant: THE REGENTS OF THE UNIVERSITY OF MICHIGAN, Ann Arbor, MI (US)

(72) Inventor: Roy Clarke, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 0 days.

(21) Appl. No.: 15/504,834

(22) PCT Filed: Aug. 21, 2015

(86) PCT No.: PCT/US2015/046219
§ 371 (c)(1),
(2) Date: Feb. 17, 2017

(87) PCT Pub. No.: WO2016/029078
PCT Pub. Date: Feb. 25, 2016

(65) Prior Publication Data
US 2017/0276810 A1    Sep. 28, 2017

Related U.S. Application Data

(60) Provisional application No. 62/040,157, filed on Aug. 21, 2014.

(51) Int. Cl.
*G01T 3/06* (2006.01)
*G01T 3/00* (2006.01)
*G01V 5/00* (2006.01)
*G01T 1/22* (2006.01)
*G01T 3/08* (2006.01)

(52) U.S. Cl.
CPC .............. *G01T 3/06* (2013.01); *G01T 1/22* (2013.01); *G01T 3/00* (2013.01); *G01T 3/08* (2013.01); *G01V 5/0091* (2013.01)

(58) Field of Classification Search
CPC ................................. G01T 3/06; G01T 1/203
See application file for complete search history.

(56) References Cited

U.S. PATENT DOCUMENTS

| | | | |
|---|---|---|---|
| 7,973,286 B2 | 7/2011 | Clarke et al. | |
| 9,329,285 B2* | 5/2016 | Gozani | ...... G01T 3/06 |
| 2004/0104356 A1* | 6/2004 | Bross | ...... G01T 3/06 |
| | | | 250/486.1 |

(Continued)

OTHER PUBLICATIONS

Neutron-Activated Gamma-Emission: Technology Review, Army Research Laboratory Jan. 2012, to Litz et al.*

(Continued)

*Primary Examiner* — Kenneth J Malkowski
(74) *Attorney, Agent, or Firm* — Harness, Dickey & Pierce, P.L.C.

(57) ABSTRACT

An optoelectronic neutron detector and method for detecting nuclear material having a neutron capture and scatter medium receiving neutrons and producing secondary charged particles, a photodetector detecting emitted light from the secondary charged particles and outputting a detector signal, and a controller receiving the detector signal and providing an alert or quantitative indication of detected nuclear material in response to the detector signal.

12 Claims, 4 Drawing Sheets

(56) References Cited

U.S. PATENT DOCUMENTS

| | | | |
|---|---|---|---|
| 2010/0038551 A1* | 2/2010 | Bell | G01T 3/00 250/390.12 |
| 2011/0049379 A1 | 3/2011 | Moses | |
| 2011/0192981 A1* | 8/2011 | Menge | G01T 1/203 250/362 |
| 2011/0233420 A1* | 9/2011 | Feller | G01T 3/00 250/391 |
| 2011/0266643 A1 | 11/2011 | Engelmann et al. | |
| 2011/0284755 A1 | 11/2011 | Stradins et al. | |
| 2012/0161011 A1* | 6/2012 | Menge | G01T 1/2002 250/361 R |
| 2013/0075600 A1 | 3/2013 | Nikitin et al. | |
| 2013/0075848 A1 | 3/2013 | Nikolic et al. | |
| 2015/0241579 A1* | 8/2015 | Menge | G01V 5/0091 250/368 |

OTHER PUBLICATIONS

International Search Report and Written Opinion of the ISA for PCT/US2015/046219, ISA/KR, Daejeon, dated Nov. 30, 2015.
International Preliminary Report on Patentability regarding PCT/US2015/046219, dated Mar. 2, 2017, 11 pages.

* cited by examiner

OPTOELECTRONIC NEUTRON DETECTOR

CROSS REFERENCE TO RELATED APPLICATIONS

This application is a U.S. National Phase Application under 35 U.S.C. 371 of International Application No. PCT/US2015/046219 filed on Aug. 21, 2015 and published as WO 2016/029078 A1 on Feb. 25, 2016. This application claims the benefit of U.S. Provisional Application No. 62/040,157, filed on Aug. 21, 2014. The entire disclosures of the above applications are incorporated herein by reference.

GOVERNMENT INTEREST

This invention was made with government support under DTRA01-03-D-0009-0010 awarded by the Department of Defense/Defense Threat Reduction Agency and N66001-97-D-5028 awarded by the U.S. Navy/ONR. The Government has certain rights in the invention.

FIELD

The present disclosure relates to an optoelectronic neutron detector.

BACKGROUND AND SUMMARY

This section provides background information related to the present disclosure which is not necessarily prior art. This section provides a general summary of the disclosure, and is not a comprehensive disclosure of its full scope or all of its features.

This solid state neutron detector fills a gap for sensitive compact and wearable sensors for homeland security applications. The potential applications include detection, identification and verification of special nuclear materials (plutonium and highly enriched uranium and others) which emit neutrons at characteristic unique energies. The device can be deployed at border posts and truck crossings to detect illicit traffic of nuclear weapon grade material. The solid state detector is a possible replacement for current He-3 gas based detectors which are extremely expensive, bulky, and unsustainable, because the He-3 gas supply is dwindling with no plans to produce more. The solid state neutron detector is very compact (cell-phone size) and can be worn as a real time dosimeter by first responders, nuclear power workers, airline flight crew, and military personnel. Real time wearable neutron dosimetry is not possible with bulky gas-based detectors. Another potential market space is down-hole gas and shale oil prospecting, where He-3 neutron detectors are currently used to measure hydrocarbon yield in oil-bearing shales.

The design is much more compact than current gas-based and scintillator neutron-detection approaches, potentially enabling a transformative detector development, namely wearable real-time neutron dosimetry for homeland security applications. The technical objectives of the present teachings are to quantitatively benchmark the proposed design against existing neutron detector approaches, to evaluate the efficiency and sensitivity of the design, and to evaluate its gamma-ray: neutron discrimination capabilities.

Evaluation of the neutron:gamma discrimination characteristics includes a thorough quantitative assessment of the detector front-end material response to neutron radiation and evaluation of its optoelectronic characteristics. The invention is a novel disruptive neutron detection approach according to the principles of the present invention, including excellent neutron:gamma discrimination and directionality.

The present detector invention enables portability, low cost, real time signal capability, complete integration with silicon microdevice technology and internet network connectivity. The present device approach, for the first time, combines a directional optical converter (neutrons to secondary electrons to light) with state-of-the-art optoelectronic detection to provide a digital output which is compatible with wireless reporting protocols, in an "Internet of Everything" scenario. The present device can therefore be reconfigured for many radiation detection tasks that are currently not feasible with larger, bulky devices using conventional gas proportional detector technology. This invention therefore opens up new opportunities for a class of compact, cost-effective neutron detectors. The invention is at the forefront of neutron detection science, for the first time utilizing radiation response of a high density of large capture cross-section B-10 nuclei in a high-purity glass network.

The broader impact of the present teachings is the potential to bring a disruptive neutron detector technology to market, filling an urgent demonstrated need for real time, portable and wearable radiation detectors. Successful implementation of this innovative technology will serve a broad customer need in the nuclear detection and verification industry. Customer channels include homeland security personnel, first responders, nuclear power industry workers, airline staff and national lab staff, all of whom need a capability to detect the presence of both naturally occurring and neutron emitting radioactive materials, and to assess the health physics risk in real time.

Market research indicates large scale potential for this invention. This market is currently well served with gamma ray and x-ray detection devices, but the capabilities for wearable neutron dosimeters are not as well established at this time. The present teachings will close this gap and is anticipated to have a very broad impact. The Čerenkov detector technology can also be transformative in enabling new kinds of directional arrays for neutron imaging and portal detectors, helping to make the nation's borders more secure against illicit nuclear materials and providing improved tools for nuclear safeguards and verification.

The present teachings is based on an optoelectronic detection mechanism such that neutrons interacting with a large capture cross section nucleus (Boron-10) produce secondary charged particles (energetic electrons) which then emit light, either by fluorescence (scintillation) or by the Cerenkov effect. This light is then detected by a sensitive photodetector (photomultiplier tube, p-i-n diode, or avalanche photodiode, or Charge coupled device or CMOS imager).

The present teachings, in some embodiments and in various combinations, employ all-solid-state optoelectronics technology, use a boron-loaded glass (like borosilicate glass) as a neutron capture/scattering medium, use of Čerenkov radiation to make fast neutrons visible to the photodetector, employ directional neutron detection because Čerenkov radiation is emitted in a cone paraxial with the direction of the incident neutron (unlike scintillation which is isotropic), can be fabricated without the need for a clean room or complicated lithography, and employ components that are largely off-the-shelf.

The present teachings may find utility in a wide variety of applications and/or personnel, including, but not limited to, homeland security, detection of special nuclear materials, border protection authorities, coastguard personnel, military personnel, nuclear power workers, airline crew, and oil well logging for hydrocarbon content and environmental contamination assessments.

The present teachings may further provide a number of advantages over conventional systems, including, but not limited to, all-solid-state providing a compact structure compared to gas proportional detectors, real-time notification of neutron radiation danger, off-the-shelf components, wirelessly networkable and fully integrated with silicon microelectronics, compatible with the internet of things, directional in order to image neutron source location, fast pulse signal for using pulse shape discrimination for gamma rejection, low voltage/low power operation, simple manufacturing processes, and convenient integration with solid state gamma radiation detectors.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
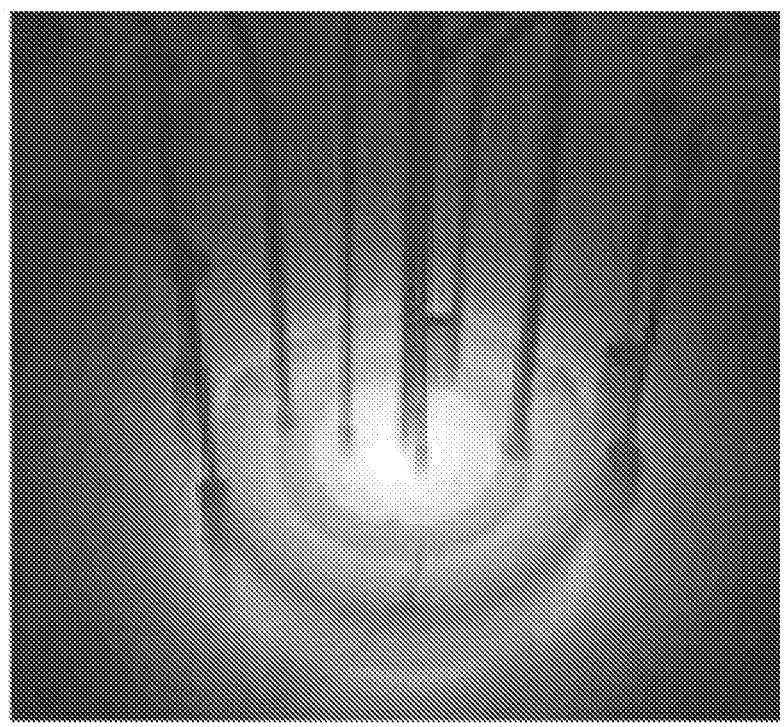
FIG. 1 is a photo of Čerenkov radiation inside a nuclear reactor core.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

I. SUMMARY

The threat of global terrorism and nuclear incidents is driving governments and companies around the world to invest heavily in new safety and security technologies to more effectively detect and protect against a wide variety of radiological and nuclear hazards. Strong civilian and military demand has emerged for new detection technologies that can provide early warnings in real time with smaller form factors and lower power consumption.

In response, as illustrated in the figures, the present teachings are presented that provide a novel, entirely solid-state and highly scalable neutron detector 10 based on the Čerenkov effect, which is responsible for the characteristic "blue glow" observed from nuclear fuel rods immersed in a liquid moderator (FIG. 1). The detector 10 combines a Čerenkov radiation (ČR) converter 12 on the front end (B-10 loaded or naturally occurring B-10, in a borosilicate glass particle detector) with modern optoelectronics device technology 14 (p-i-n diode or compact photomultiplier tube) to produce a highly compact and sensitive detector which provides real-time digital signals of the presence of neutron radiation. Many neutron radiation detection approaches are already commercialized (e.g. He-3, boron-lined tubes, Bubble Detectors) or under rapid development (e.g. Li-6 coated fibers, thin-film Li coupled to flat plate gas chambers) to meet the strong market demand for this technology, but most are not suited to wearable detection. A 100% solid-state detection approach is therefore an appealing market opportunity.

The Innovation

Figure 2:
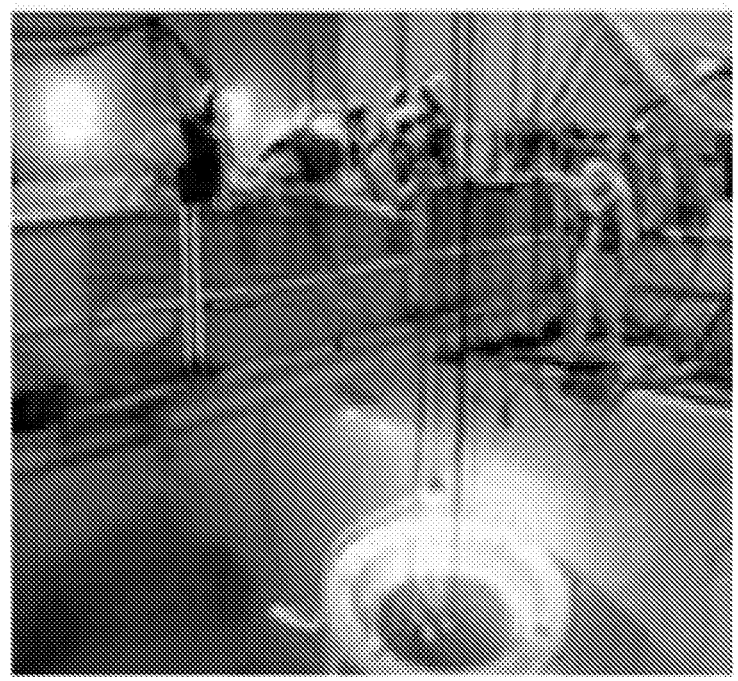
FIG. 2 is a photo illustrating private sector workers being exposed to radiation during routine power plant operations, such as refueling.
Figure 3:
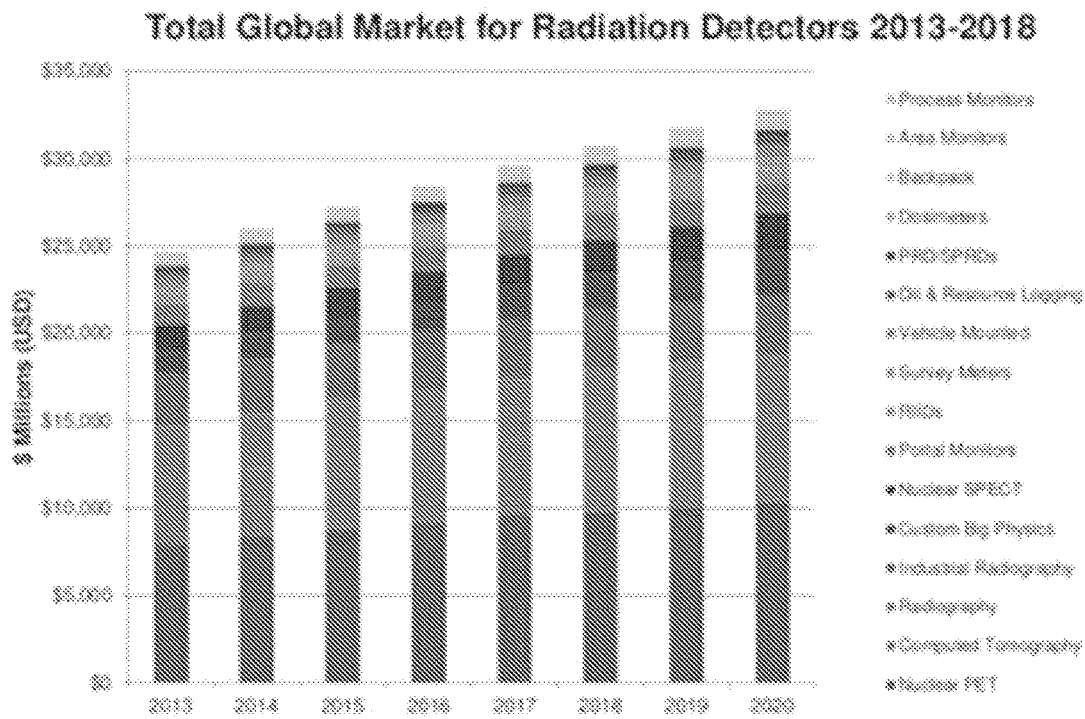
FIG. 3 illustrates radiation detector market sizing and segmentation by Nanomarkets in 2013.

The present teachings provide a new type of all-solid-state neutron detector 10 based on the Čerenkov effect. It has long been known that charged particles traveling through a dielectric optical medium, such as water or glass, at speeds faster than the phase velocity of light in that medium, can emit light in the short-wavelength light (blue) portion of the electromagnetic spectrum known as Čerenkov radiation (ČR). The effect is responsible for the intense blue glow that can be observed from nuclear fuel rods immersed in a liquid moderator (see FIGS. 1 and 2) and is analogous to the bow wave generated by a ship as it moves through water, or alternately the shock wave (sonic boom) familiar from supersonic flight.

The detector 10 combines the front end of a particle detector 12 with modern optoelectronics device technology 14 to produce a compact sensitive detector which is portable, and indeed wearable, providing real-time digital signals of the presence of neutron radiation. This capability does not currently exist and is the technology gap we are addressing here. Our device concept fills a well-documented need for compact real-time neutron detectors and dosimeters and represents a significant commercialization opportunity. The proposed approach is both transformative and disruptive: transformative in that it makes possible new capabilities, for example placing neutron detectors on the uniforms of homeland security personnel to warn of the presence of illicit special nuclear materials, such as highly enriched uranium and plutonium. Current neutron detection technology, which usually involves a bulky gas-phase front end, is not feasible as a wearable, or even easily portable, detection system for such applications. The detector 10, based on a borosilicate glass front end ČR converter 12 coupled to a sensitive solid-state p-i-n diode 14 (see FIG. 4) and has a form-factor very similar to a smart-phone. It therefore overcomes these difficulties, solves the problem of portability, and has a huge advantage in being fully solid state and thus compatible with modern silicon device technology.

Briefly, the device concept works like this: first, the neutron (either a fast neutron or moderated to thermal energies) enters the boron-containing glass front-end 12, interacts with a B-10 atom, ionizing by nuclear scattering or emitting charged particles such as alpha particles (He-4 nuclei). These charged particles produce a cascade of ionization electrons which are moving close to the vacuum speed of light and consequently much faster than the phase velocity of light in the glass. The ČR thus produced travels through the glass as a conical wavefront (see FIG. 4) and this light then enters the p-i-n diode 14 and is detected as a charge pulse (via electron-hole generation). This pulse is then amplified by a high-gain, low noise charge amplifier 16, outputting a voltage to an ASIC chip 18, which records the count rate and integrates the dose received for later readout and archiving. The signals can also be reported wirelessly.

Several boron-containing solids, such as boron nitride in various forms, have been investigated for their potential as neutron detectors with the goal of utilizing the very high neutron capture cross section of boron-10 isotope, one of the highest values available for use in solid state detectors; B-10 is not as favorable as He-3, but the latter can only be used in gaseous form and is currently in extremely short supply. Most important, this research has identified borosilicate glass as a potentially useful front-end detector medium 12 for producing ČR via B-10 neutron capture/collisions and charged particle production, which is needed for the observation of ČR.

The key technical advantages of the present teachings are described as follows: first, this is a solid state optoelectronic device and therefore starts with the advantage that a great deal of sophistication has already been applied to various components that are needed. This is especially true of the photodetectors 14, which are available off the shelf in large area ($cm^2$) deep-depletion versions that are suitable for short-wavelength ČR detection and are well adapted to this application. As to the glass front-end, this is also advantageous as high-purity borosilicate glass is commonly available for optics applications. It has not been used as a neutron detector medium to date. One technical challenge associated with the front-end however relates to optimizing the borosilicate glass by enriching the B-10 content, from naturally occurring 20% to 100% if possible. A second technical challenge is to reduce the form-factor of the device to wearable dimensions (a few square inches). A third technical challenge will be to identify appropriate low noise charge amplifiers that are sufficiently sensitive for the task of capturing the small electronic signal from the ČR light pulse. The approach takes advantage of excellent amplifiers that are already available at low cost. Computer simulations predict a low level of interaction of gamma rays (high energy electromagnetic radiation) with the detector front-end and the p-i-n diode. Preliminary measurements assure a high level of gamma discrimination.

BACKGROUND

Since the 1970s, the "Gold Standard" for many applications requiring neutron detection has been pressurized He-3 gas, usually contained in a tube constructed as a gas proportional detector. The reason for this is that the nucleus of the He-3 isotope has a very large cross-section for neutron capture (table 1), However, being a gas, it has low density and also has exceedingly small concentration in natural abundance. These two aspects, coupled with a diminishing supply which has become acute over the last few years has motivated an urgent search for alternate approaches to gas-proportional neutron detection. Of the available alternates, which are unfortunately far from numerous, several solid-state approaches have been broached as potential solutions to this problem.

A consideration of solid-, and liquid-, materials properties, in particular their optoelectronic behavior, therefore becomes a central area of interest in this field. For example, liquid and solid scintillators, typically polymeric materials or optical fibers doped with rare earths, are being actively pursued as neutron detector materials. Isotopes of Lithium or Boron are often included as neutron capture agents on account of their relatively high absorption cross sections. B-10 for example, has a significant (20%) natural abundance approaching the exceptional absorption of He-3 (see table 1). Given the high density of Boron in the active front-end (borosilicate-glass), the overall efficiency of a boron-containing solid-state detector can rival or even exceed that of a He-3 tube detector, in a much more compact form factor. Li-6, while less abundant, also has a relatively large cross section, but is chemically highly reactive. These isotopes, which are non-radioactive, like He-3 are among the lightest nuclei in nature and have the advantage that they are relatively insensitive to gamma rays, which are electromagnetic in nature and therefore interact more strongly with high-Z elements.

TABLE 1 absorption cross sections for three of the most favorable neutron capture agents, He, B and Li, in both the naturally abundant state, and for each stable isotope. The values are given for 2200 m/s (thermal) neutrons.

| Element/isotope | Concentration (%) | Absorption cross-section (barns) |
|---|---|---|
| He (natural abundance) | — | 0.00747 |
| He-3 | 0.00014 | 5333 |
| He-4 | 99.99986 | 0 |
| B (natural abundance) | — | 767 |
| B-10 | 20 | 3835 |
| B-11 | 80 | 0.0055 |
| Li (natural abundance) | — | 70.5 |
| Li-6 | 7.5 | 940 |
| Li-7 | 92.5 | 0.0454 |

With these general considerations in mind we have chosen to focus on solid-state detection with Boron, either naturally occurring, or enriched in B-10, as the active neutron capture agent. This led to the present innovative detector approach which takes advantage of the Čerenkov radiation that is produced when a charged particle travels through a dielectric medium (borosilicate glass) at speeds close to the free-space speed of light, c. Under these conditions, the charged particles in question are moving faster than the phase velocity of the light in the dielectric (glass)=c/n, where n is the refractive index of the glass (about 1.5). Light is emitted as a conical "bow" wave with opening angle θ given by:

$$\cos \theta = c/nv \quad \text{Eq. 1}$$

where the speed of the particle is v, and c/n<v<c.

Figure 4:
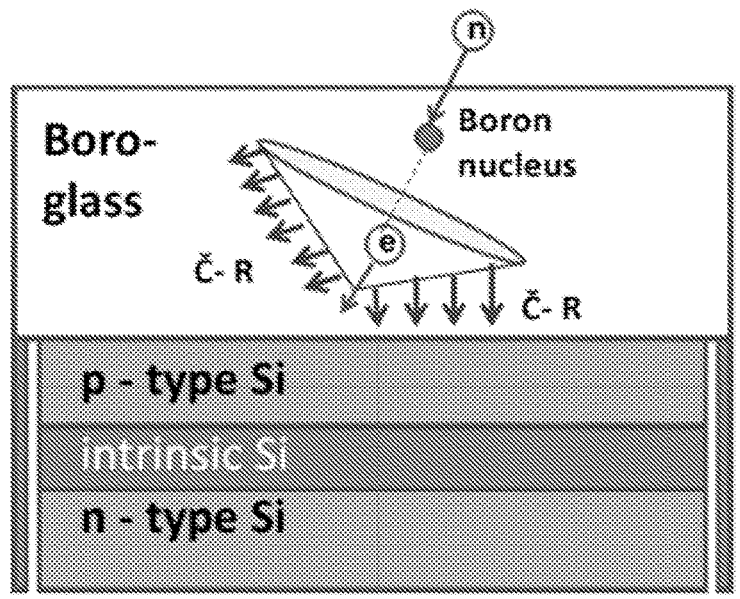
FIG. 4 is a schematic of Endectra neutron detector design showing front-end (borosilicate glass) and p-i-n photodetector.

The geometry of the emitted Čerenkov radiation (ČR) is illustrated in FIG. 4. The power spectrum of the emitted light, first derived by Frank et al. is given by:

$$dE = \frac{q^2}{4\pi} \mu(\omega)\omega \left(1 - \frac{c^2}{v^2 n^2(\omega)}\right) dx d\omega \quad \text{Eq. 2}$$

where q is the charge of the particle, μ(ω), the frequency dependent permeability and n(ω) the frequency dependent refractive index of the glass.

It can be seen from equation 2 that the energy emitted per unit length is linear in frequency (neglecting dispersion), and thus the ČR is predominantly in the blue/UV region of the spectrum. This is detected by any photodiode which has a band gap smaller in energy than that of the incident photon and therefore absorbs light strongly. A silicon photodiode works well for this purpose, although other choices (e.g. GaAs or SiC) will have smaller dark current for elevated temperature operation. Many different kinds of photodetectors are available commercially at low cost in a variety of sizes, up to several square m in area.

Figure 5:
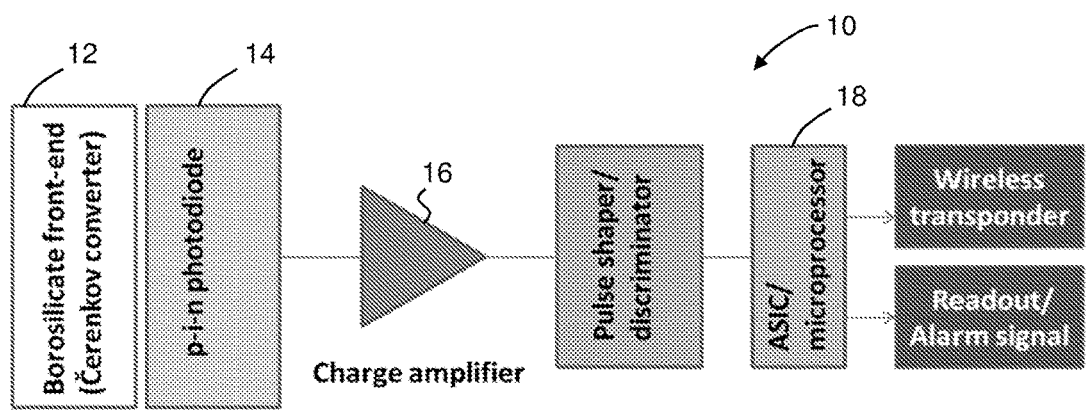
FIG. 5 is a schematic of detector system including: front-end, ČR detection photodiode, amplification and pulse shaping stages, and output signal handling.

At first sight, Čerenkov radiation may seem an unlikely candidate for detecting charge showers from secondary electrons originating in neutron interactions with B-10: the number of Čerenkov photons produced is relatively small, on the order of a few hundred per MeV of electron energy. However, recent improvements in photodiode detectors have enabled quantum-limited performance where even single photon detection is now routine. In fact the CMOS camera in the i-phone has a noise floor at this low level. Thus, with modern solid state optoelectronics, it now becomes feasible to use ČR as a viable detection mechanism for neutrons. A schematic of the practical realization of the disclosed design, is shown in FIG. 5.

The sequence of detection events is as follows: the incoming neutron interacts elastically or inelastically with the B-10 nuclei in the front end. Energetic charged particles (electrons/ions) are produced by (for example by the $^{10}$BN (n,α)$^7$Li nuclear reaction with the emission of a 1.5 MeV alpha particle which in turn leads to an avalanche of ionization events. About a thousand electrons are expected emitting copious amounts of ČR which is then detected by the photodiode. This charge pulse, lasting for about 50 ns, is then amplified by a sensitive low noise charge amplifier, shaped and output to an ASIC or microprocessor which can direct the output signal (a voltage) to a wireless transponder (Blue Tooth), or to an LED readout/warning signal. The form factor for the whole detector system is designed to be similar to that of a cell phone and in fact shares some of the same functionality including on board microprocessors, readout and wireless transponders.

The expected performance of the borosilicate glass (even unenriched) is expected to rival the sensitivity (100 cps/nv) of a $^3$He detector pressurized at 2 atm, with a 41.4-in. long $^3$He tube 1 in. diameter and 39.4 in. (100 cm) active length (Saint-Gobain Crystals 100He3/152/25).

Gamma discrimination—the active front-end of the detector consists of relatively light elements, B, Si and O, and therefore has a very low (energy dependent) absorption coefficient for γ-rays. Discrimination against γ-rays, relative to neutrons, is therefore extremely high. We anticipate that the front end will absorb ~80% of the incident neutrons, matching the thickness of the glass to the absorption length (about 150 microns) the calculated amount of free charge created by reaction with a thermal neutron is a factor of $1.4 \times 10^4$ more than that created by reaction with a 30 keV γ-ray. Although this factor for $^3$He is larger (about $5.5 \times 10^4$), the neutron-γ discrimination for a borosilicate glass ČR detector is still exceptional.

Figure 6:
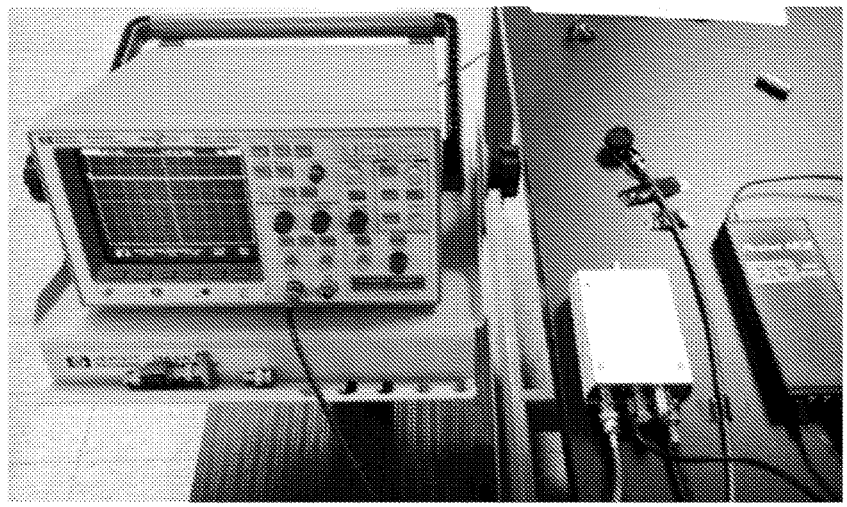
FIG. 6 is a photo of a bench-top set-up for preliminary test of Čerenkov concept.

The following summarizes evaluation results. They were obtained on a bench top set-up using a fast oscilloscope, a high quality charge amplifier and a multichannel analyzer, as illustrated in FIG. 6.

Figure 7:
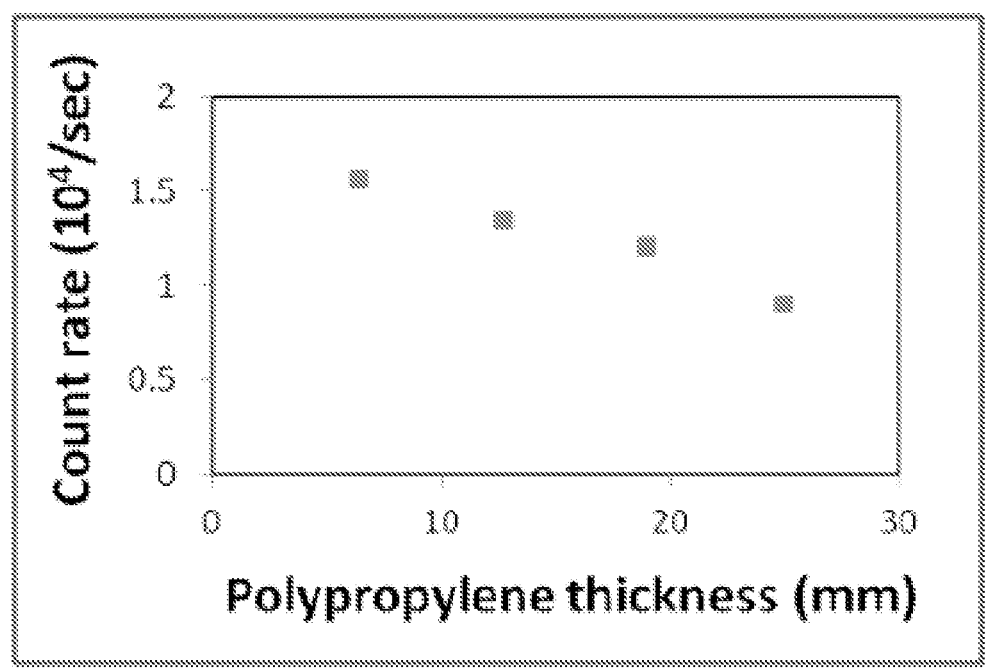
FIG. 7 illustrates the photodiode count rate during front-end (boro-glass) exposure to Cf-252 neutron source as a function of polypropylene neutron absorbor thickness.

As seen in FIG. 7, the photodiode/boro-glass combination (kept in ambient dark conditions) records several thousand counts per second, about 0.5 m from the Cf-252 neutron source. The signal was strongly attenuated by the insertion of polypropylene (a strong neutron absorber) between the source and the front-end. In contrast, insertion of a 25 mm thick block of lead (Pb) had very little effect on the recorded signal, indicating that neutrons rather than gamma rays are being registered by the detector (unlike gamma rays, neutrons are not absorbed strongly by heavy elements like Pb). These data illustrate that the detected count rate is relatively high and is associated with neutrons rather than γ-rays.

In summary, the key advantages of the proposed detector are:

- Room temperature, ambient pressure operation using earth abundant, non-toxic materials
- Small in size and weight compared to helium tubes (for given sensitivity)
- Borosilicate front-end thickness (and detection efficiency) is not limited by attenuation length of α-particles (as for conversion layer devices, including so-called perforated detectors); lots of B-10 to interact with neutrons and produce secondary electron showers
- Scalable by stacking/arraying to form larger area detectors
- Chemically/thermally stable, non-hazardous, low-voltage, low-power solid-state device
- High discrimination with respect to gamma radiation
- Directionality via conical wavefront, whereas conventional scintillation front-end is omnidirectional The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An optoelectronic neutron detector for detecting nuclear material, said detector comprising:
   a neutron capture and scatter medium comprising boron-loaded glass having Boron-10 receiving neutrons and producing secondary charged energetic alpha particles, the secondary charged energetic alpha particles producing a cascade of energetic electrons traveling faster than the phase velocity of light in the neutron capture and scatter medium;
   a photodetector detecting emitted light from said cascade of energetic electrons as an electromagnetic bow wave in a visible region of the light spectrum and outputting a detector signal; and
   a controller receiving said detector signal and providing an alert or quantitative indication of detected nuclear material in response to said detector signal.

2. The detector according to claim 1 wherein said neutron capture and scatter medium comprises borosilicate glass.

3. The detector according to claim 2 wherein said borosilicate glass is formed in the shape of a plate, a rod, or a cube.

4. The detector according to claim 1 wherein said neutron capture and scatter medium comprises boron-loaded lithium silicate glass.

5. The detector according to claim 1 wherein said neutron capture and scatter medium comprises glass enriched with Li-6 isotope.

6. The detector according to claim 1 wherein said emitted light is caused by the Čerenkov effect.

7. The detector according to claim 1 wherein said photodetector is selected from the group consisting of a p-i-n diode, an avalanche photodiode, a charged coupled device, and a CMOS imager.

8. The detector according to claim 1, wherein said controller determining the energy of the neutrons as a result of the number of electric charges detected per pulse.

9. The detector according to claim 1, wherein said controller determining the energy of the neutrons as a result of a pulse shape of a charge packet detected by the detector.

10. An array of detectors comprising:
    a plurality of detectors arranged in a multi-dimensional configuration, each of said plurality of detectors configured to detect nuclear material, each of said plurality of detectors having a neutron capture and scatter medium comprising boron-loaded glass having Boron-10 receiving neutrons and producing secondary charged energetic alpha particles, the secondary charged energetic alpha particles producing a cascade of energetic electrons traveling faster than the phase velocity of light in the neutron capture and scatter medium, a photodetector detecting emitted light from said cascade of energetic electrons as an electromagnetic bow wave in a visible region of the light spectrum and outputting a detector signal, and a controller receiving said detector signal and providing an alert or quantitative indication of detected nuclear material in response to said detector signal.

11. A method of detecting nuclear material comprising:
    exposing a neutron capture and scatter medium comprising boron-loaded glass having Boron-10 to neutrons and producing secondary charged energetic alpha particles emitting light as an electromagnetic bow wave in a visible region of the light spectrum, the secondary charged energetic alpha particles producing a cascade of energetic electrons traveling faster than the phase velocity of light in the neutron capture and scatter medium;
    detecting said light from said cascade of energetic electrons and outputting a signal; and
    processing said signal and outputting an indication of the presence or absence of nuclear material.

12. The method of detecting nuclear material according to claim 11 wherein the detecting said light comprises detecting a conical direction of the electromagnetic bow wave to determine the direction from which the neutrons are emitted.

* * * * *